(12) United States Patent
Kelly et al.

(10) Patent No.: US 12,138,863 B2
(45) Date of Patent: Nov. 12, 2024

(54) SYSTEM AND METHOD FOR COMPUTED AXIAL LITHOGRAPHY (CAL) FOR 3D ADDITIVE MANUFACTURING

(71) Applicants: Lawrence Livermore National Security, LLC, Livermore, CA (US); The Regents of the University of California, Oakland, CA (US)

(72) Inventors: Brett Kelly, Berkeley, CA (US); Robert Matthew Panas, Dublin, CA (US); Maxim Shusteff, Piedmont, CA (US); Christopher Spadaccini, Oakland, CA (US); Hayden Taylor, Berkeley, CA (US); Indrasen Bhattacharya, Berkeley, CA (US)

(73) Assignees: Lawrence Livermore National Security, LLC, Livermore, CA (US); The Regents Of The University Of California, Oakland, CA (US)

(*) Notice: Subject to any disclaimer, the term of this patent is extended or adjusted under 35 U.S.C. 154(b) by 293 days.

(21) Appl. No.: 17/704,072

(22) Filed: Mar. 25, 2022

(65) Prior Publication Data
US 2022/0212414 A1     Jul. 7, 2022

Related U.S. Application Data

(62) Division of application No. 16/691,053, filed on Nov. 21, 2019, now Pat. No. 11,370,173, which is a
(Continued)

(51) Int. Cl.
*B29C 64/393* (2017.01)
*B29C 64/129* (2017.01)
(Continued)

(52) U.S. Cl.
CPC .......... *B29C 64/393* (2017.08); *B29C 64/129* (2017.08); *B29C 64/232* (2017.08);
(Continued)

(58) Field of Classification Search
CPC ... B29C 64/393; B29C 64/129; B29C 64/232; B29C 64/241; B29C 64/245; B29C 64/264; B29C 64/277; B33Y 50/02; B33Y 10/00
See application file for complete search history.

(56) References Cited

U.S. PATENT DOCUMENTS

| 4,041,476 A | 8/1977 | Swainson |
|---|---|---|
| 5,011,635 A | 4/1991 | Murphy et al. |

(Continued)

FOREIGN PATENT DOCUMENTS

| EP | 0451681 A2 | 10/1991 |
|---|---|---|
| EP | 3068610 A1 | 9/2016 |

(Continued)

OTHER PUBLICATIONS

T. A. Schaedler et al., "Ultralight Metallic Microlattices," Science, vol. 334, No. 6058, pp. 962-965, Nov. 2011.
(Continued)

*Primary Examiner* — Michael M. Robinson
(74) *Attorney, Agent, or Firm* — HARNESS, DICKEY & PIERCE, P.L.C.

(57) ABSTRACT

In one aspect the present disclosure relates to a system for forming a three dimensional (3D) object from a volume of photo-responsive material contained within a material container. A plurality of optical projection subsystems are adapted to be arranged at least partially circumferentially around a material container containing the volume of photo-responsive material, and are controlled by a controller. The optical projection subsystems direct optical projections at a (Continued)

plurality of angles θ through the volume of photo-responsive material. The optical projections are further directed about a z axis extending through the volume of photo-responsive material. The plurality of optical subsystems are further controlled by the controller to provide each of the optical projections with a calculated three-dimensional intensity distribution acting over a fixed temporal exposure period, which is sufficient to at least one of cure or remove selected portions of the volume of photo-responsive material, and leave other portions unmodified, to form a desired 3D part.

24 Claims, 4 Drawing Sheets

Related U.S. Application Data division of application No. 15/593,947, filed on May 12, 2017, now Pat. No. 10,647,061.

(51) Int. Cl.
| | | |
|---|---|---|
| B29C 64/232 | (2017.01) | |
| B29C 64/241 | (2017.01) | |
| B29C 64/245 | (2017.01) | |
| B29C 64/264 | (2017.01) | |
| B29C 64/277 | (2017.01) | |
| B33Y 10/00 | (2015.01) | |
| B33Y 30/00 | (2015.01) | |
| B33Y 50/02 | (2015.01) | |

(52) U.S. Cl.
CPC .......... *B29C 64/241* (2017.08); *B29C 64/245* (2017.08); *B29C 64/264* (2017.08); *B29C 64/277* (2017.08); *B33Y 50/02* (2014.12); *B33Y 10/00* (2014.12); *B33Y 30/00* (2014.12)

(56) References Cited

U.S. PATENT DOCUMENTS

| 5,217,653 A * | 6/1993 | Mashinsky ........... B29C 64/135 |
| | | 219/121.28 |
| 5,497,254 A | 3/1996 | Amako et al. |
| 8,579,620 B2 | 11/2013 | Wu |
| 2010/0029801 A1 | 2/2010 | Moszner et al. |
| 2010/0321478 A1 | 12/2010 | Sliwa et al. |
| 2012/0045617 A1 | 2/2012 | Yasukochi |
| 2014/0339741 A1* | 11/2014 | Aghababaie ......... B29C 64/124 |
| | | 264/401 |
| 2015/0137426 A1 | 5/2015 | Van Esbroeck et al. |
| 2015/0228226 A1 | 8/2015 | Luebke et al. |
| 2015/0290874 A1* | 10/2015 | Chen ...................... B33Y 30/00 |
| | | 425/174.4 |
| 2015/0309473 A1* | 10/2015 | Spadaccini ............ B33Y 10/00 |
| | | 359/3 |
| 2016/0033874 A1 | 2/2016 | Tang et al. |
| 2016/0067922 A1 | 3/2016 | Voris et al. |
| 2016/0107380 A1* | 4/2016 | Smoot ................... B29C 64/124 |
| | | 264/401 |
| 2016/0170218 A1 | 6/2016 | Johnson et al. |
| 2016/0182782 A1 | 6/2016 | El-Ghoroury et al. |
| 2016/0271875 A1 | 9/2016 | Brown, Jr. |
| 2018/0153205 A1 | 6/2018 | Wu |

FOREIGN PATENT DOCUMENTS

| JP | H04267132 A | 9/1992 |
| JP | 2001322177 A | 11/2001 |
| JP | 2010036537 A | 2/2010 |
| KR | 20160110938 A | 9/2016 |
| WO | WO-2016023133 A1 | 2/2016 |
| WO | 2016172805 A1 | 11/2016 |
| WO | WO-2016209654 A1 | 12/2016 |

OTHER PUBLICATIONS

Y. Lin, A. Harb, K. Lozano, D. Xu, and K. P. Chen, "Five beam holographic lithography for simultaneous fabrication of three dimensional photonic crystal templates and line defects using phase tunable diffractive optical element," Opt. Express, vol. 17, No. 19, p. 16625, Sep. 2009.
J. R. Tumbleston et al., "Continuous liquid interface production of 3D objects," Science, vol. 347, No. 6228, pp. 1349-1352, Mar. 2015.
M. Shusteff et al., "Additive Fabrication of 3D Structures by Holographic Lithography," in Proceedings of the 26th Annual International Solid Freeform Fabrication Symposium, Austin, TX, 2016, pp. 1183-1192.
S. W. Smith, The Scientist & Engineer's Guide to Digital Signal Processing, 1st edition. San Diego, Calif: California Technical Pub, 1997.
T. Bortfeld, J. Bürkelbach, R. Boesecke, and W. Schlegel, "Methods of image reconstruction from projections applied to conformation radiotherapy," Phys. Med. Biol., vol. 35, No. 10, pp. 1423-1434, Oct. 1990.
R. Bracewell, "Strip Integration in Radio Astronomy," Aust. J. Phys., vol. 9, No. 2, p. 198, 1956.
R. N. Bracewell, "Numerical Transforms," Science, vol. 248, No. 4956, pp. 697-704, May 1990.
D. Dendukuri, P. Panda, R. Haghgooie, J. M. Kim, T. A. Hatton, and p. S. Doyle, "Modeling of Oxygen-Inhibited Free Radical Photopolymerization in a PDMS Microfluidic Device," Macromolecules, vol. 41, No. 22, pp. 8547-8556, Nov. 2008.
Ng, R., 2006. Digital light field photography (Doctoral dissertation, Stanford University).
Lanman, D. and Luebke, D., 2013. Near-eye light field displays. ACM Transactions on Graphics (TOG), 32(6), p. 220.
International Search Report and Written Opinion of corresponding International PCT Application No. PCT/US2018/024475, dated Nov. 7, 2018, 10 pp.
Extended European Search Report regarding EP 18797947.1, dated Nov. 30, 2020.
Office Action regarding Japanese Patent Application No. 2019-562425, dated Mar. 2, 2021.

* cited by examiner x' describes propagation direction in sequential exposure case

SYSTEM AND METHOD FOR COMPUTED AXIAL LITHOGRAPHY (CAL) FOR 3D ADDITIVE MANUFACTURING

CROSS-REFERENCE TO RELATED APPLICATIONS

This application is a divisional and claims the benefit of U.S. patent application Ser. No. 16/691,053, filed on Nov. 21, 2019 (now allowed); which is a divisional of U.S. patent application Ser. No. 15/593,947, filed on May 12, 2017 (now U.S. Pat. No. 10,647,061). The entire disclosure of each of the above applications is incorporated herein by reference.

FEDERALLY SPONSORED RESEARCH OR DEVELOPMENT

This invention was made with Government support under Contract No. DE-AC52-07NA27344 awarded by the United States Department of Energy. The Government has certain rights in the invention.

FIELD

The present disclosure relates to systems and methods for performing additive manufacturing, and more particularly to a system and method directed to volumetric fabrication using computed tomography (CT) techniques.

BACKGROUND

This section provides background information related to the present disclosure which is not necessarily prior art.

Additive manufacturing (AM) fabrication methods are proliferating rapidly, with photopolymer-based approaches comprising some of the most prominent methods. These stereolithographic techniques provide a useful balance of resolution, build speed, process control, and capital cost. However, these system metrics typically must be traded off one against another. Resolving the speed limitations, surface roughness (stair-step artifacts), and requirements for support structures will provide the next major steps forward in the progress of these technologies.

As additive manufacturing (AM) technologies gain prominence and versatility, one constraint on nearly every AM approach is the reliance on serially repeating low-dimensional unit operations, building structures up voxel-by-voxel, or layer-by-layer. This can be an advantage, yielding significant process flexibility, but is often a shortcoming, imposing deficiencies in surface finish and dimensional limitations; for instance, it is impossible to produce smoothly curving geometries. A few approaches have demonstrated the capability to generate 3D structures without requiring planar slicing, notably Hughes Research Laboratories' fabrication of lattices via latticed light-beams (see, T. A. Schaedler et al., "*Ultralight Metallic Microlattices*," Science, Vol. 334, No. 6058, pp. 962-965, November 2011) and photonic crystals produced by interference lithography (see, Y. Lin, A. Harb, K. Lozano, D. Xu, and K. P. Chen, "*Five beam holographic lithography for simultaneous fabrication of three dimensional photonic crystal templates and line defects using phase tunable diffractive optical element*," Opt. Express, Vol. 17, No. 19, p. 16625, September 2009.). However, these approaches are limited to periodic structures, with one of the dimensions substantially smaller than two others. Even Carbon3D's "continuous" liquid interface process (see, J. R. Tumbleston et al., "*Continuous liquid interface production of 3D objects*," Science, Vol. 347, No. 6228, pp. 1349-1352, March 2015) still requires sequential fabrication based on 2D discretization.

Expanding the AM technology base to include fabrication by means of 3-D unit operations, which generate 3D shapes with arbitrary geometry ("volume at once") is highly desirable. Such approaches are in their infancy: the first "volume-at-once" photopolymer-based fabrication was recently demonstrated as noted in M. Shusteff et al., "*Additive Fabrication of 3D Structures by Holographic Lithography*," in Proceedings of the 26th Annual International Solid Freeform Fabrication Symposium, Austin, TX, 2016, pp. 1183-1192. This approach used a holographically-shaped light field generated by a phase-only liquid crystal on silicon (LCoS) spatial light modulator (SLM). The geometries achievable by the Shusteff et al., approach are limited due to having constant cross-section along each of three orthogonal directions. This limitation arises largely from the small diffractive angles available from state of the art SLMs owing to their relatively large pixel size (minimum approximately 4 μm, but more typically 8 μm or larger).

SUMMARY

This section provides a general summary of the disclosure, and is not a comprehensive disclosure of its full scope or all of its features.

In one aspect the present disclosure relates to a system for forming a three dimensional (3D) object from a volume of photo-responsive material contained within a material container. The system may comprise a controller and a plurality of optical projection subsystems. The plurality of optical projection subsystems are adapted to be arranged at least partially circumferentially around a material container containing the volume of photo-responsive material, and are in communication with the controller. The plurality of optical projection subsystems are controlled by the controller to direct optical projections at a plurality of angles θ through the volume of photo-responsive material, the optical projections further being directed about a z axis extending through the volume of photo-responsive material. The plurality of optical subsystems are further controlled by the controller to provide each of the optical projections with a calculated three-dimensional intensity distribution acting over a fixed temporal exposure period, which is sufficient to cure at least selected portions of the volume of photo-responsive material, and leave other portions unmodified, to form the 3D object.

In another aspect the present disclosure relates to a system for forming a three dimensional (3D) object from a volume of photo-responsive material contained within a material container. The system may comprise a plurality of OLED arrays each forming an independent optical projection subsystem. The OLED arrays are configured at least partially circumferentially around a material container containing the volume of photo-responsive material. The plurality of OLED arrays are configured to direct optical projections at a plurality of different angles θ through the volume of photo-responsive material. The plurality of OLED arrays further provide each of the optical projections with a calculated three-dimensional intensity distribution acting over a fixed temporal exposure period, which is sufficient to cure selected portions of the volume of photo-responsive material, and leave other portions unmodified, to form the 3D object.

In still another aspect the present disclosure relates to a system for forming a three dimensional (3D) object from a volume of photo-responsive material contained within a material container. The system may comprise an optical projection subsystem for generating a plurality of two dimensional (2D) optical projections aimed at the material container, and a rotating arm assembly. The rotating arm assembly includes a plurality of mirrors configured to receive and direct the plurality of 2D optical projections toward the volume of photo-responsive material, such that ones of the plurality of 2D optical projections are directed at a plurality of different angles θ relative to the volume of photo-responsive material contained in the material container, to thus cure at least selected portions of the photo-responsive material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2A:
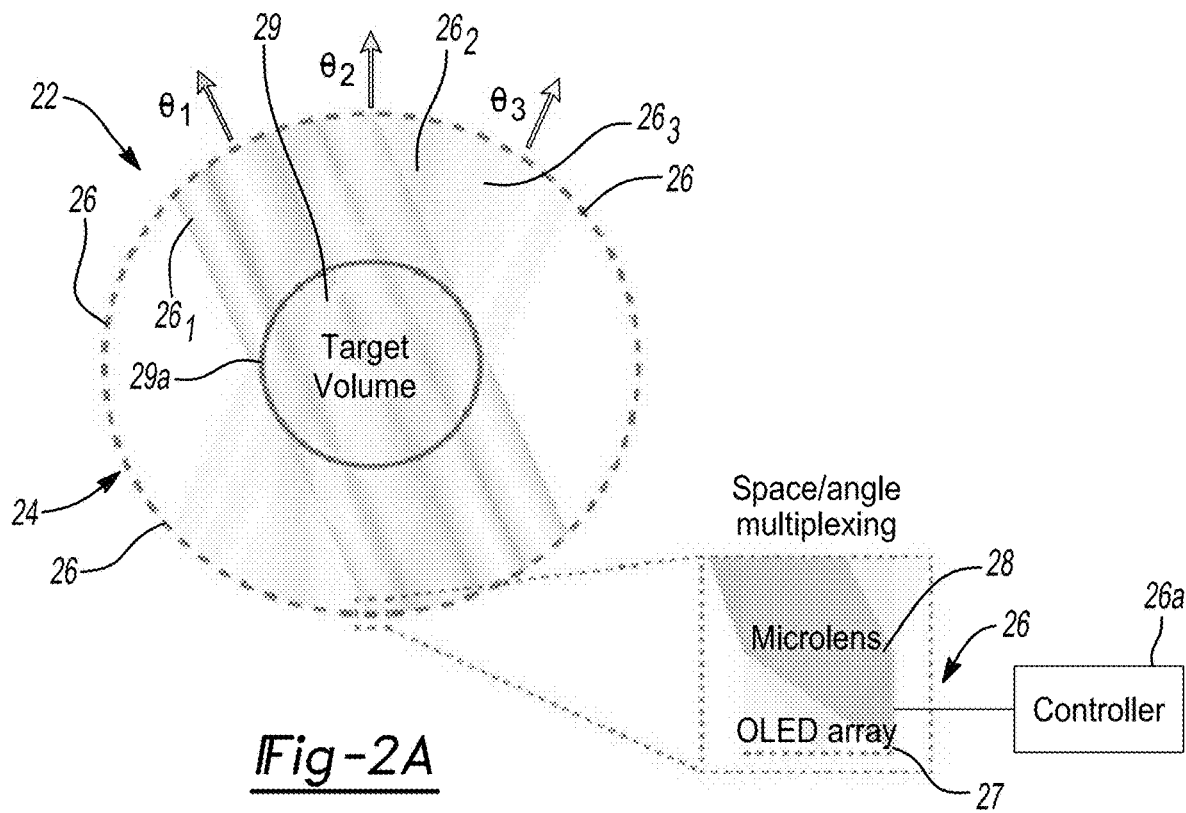
Figure 2B:
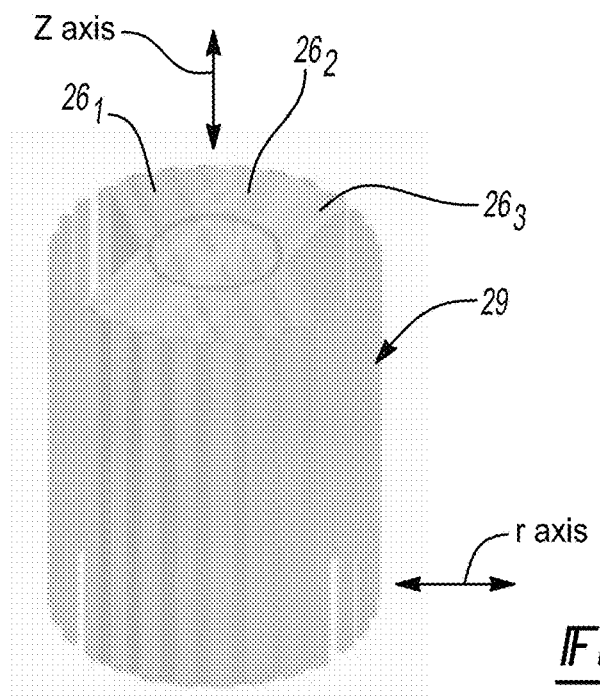
Figure 3:
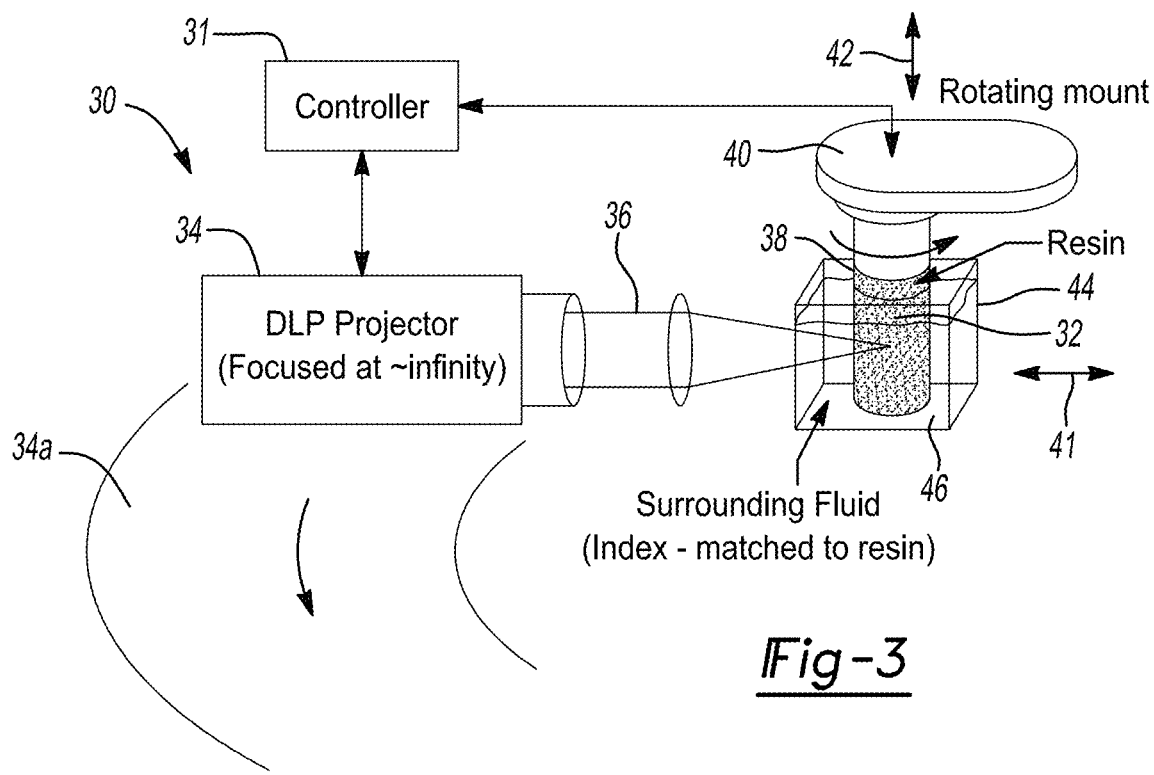

FIG. 2A shows one embodiment of a system in accordance with the present disclosure that makes use of a system of light sources and lenses or other optics arranged circumferentially around a target resin volume, to simultaneously generate projections at each angle θ. The simultaneous superposition of 3D intensity maps emanating from all projections is used to cure selected portions of the resin in one operational step;

FIG. 2B shows a 3D representation of the embodiment in FIG. 2A with the various optical projections passing through the target volume of resin at different angles θ;

FIG. 3 shows a high level diagram of another embodiment of the present disclosure in which the target resin volume container is rotated by a rotating mount or stage, while an optical projection generating component provides a single projection at a fixed time. This projection creates a 3D intensity field in the volume. As the resin volume rotates with time and the angle θ is changed, the projections are updated.

Figure 4:
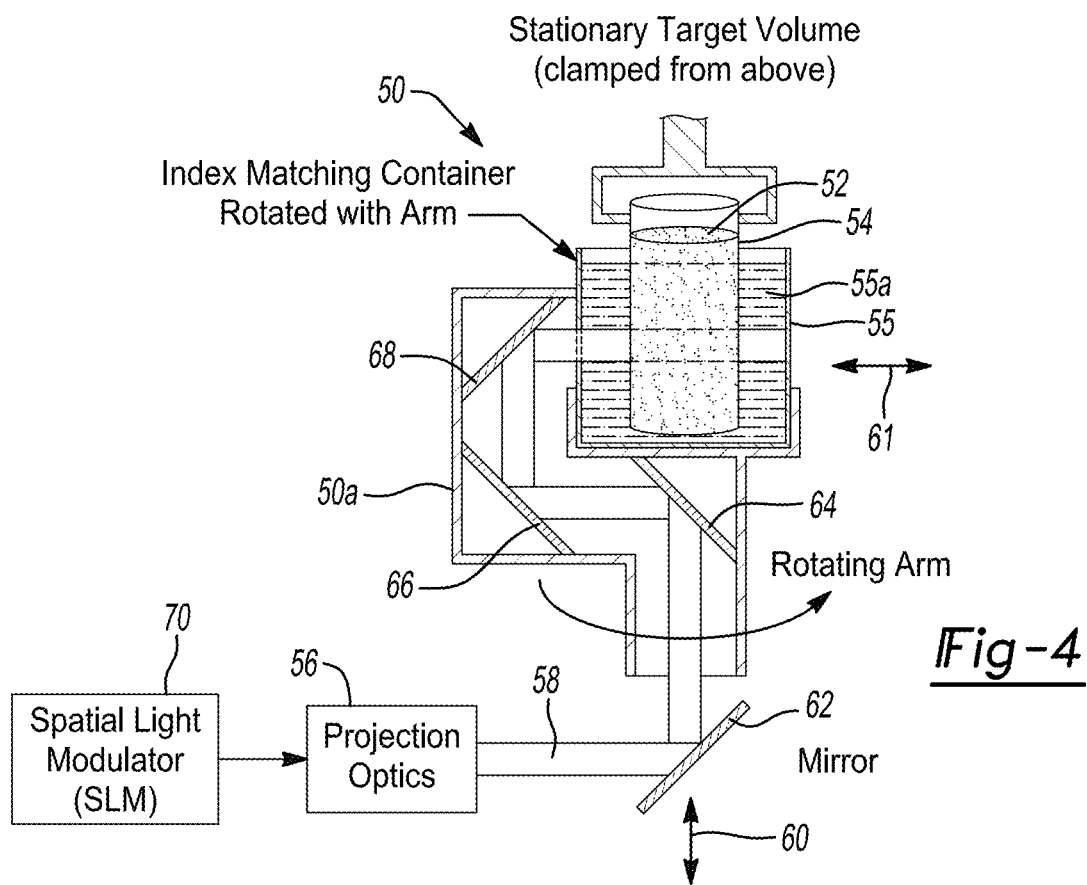

FIG. 4 shows a high level diagram of another embodiment of the present disclosure in which the target resin volume container is maintained stationary, and a rotating arm assembly directs optical projections from varying angles θ.

Corresponding reference numerals indicate corresponding parts throughout the several views of the drawings.

DETAILED DESCRIPTION

Example embodiments will now be described more fully with reference to the accompanying drawings.

The approach described in the present invention disclosure accomplishes volumetric fabrication by applying computed tomography (CT) techniques in reverse, that is, by fabricating structures by exposing a photopolymer resin volume with a 3D light field from multiple angles, and updating the light field at each angle. The necessary light fields are spatially and/or temporally multiplexed, such that their summed energy dose in a target resin volume crosslinks the resin into a user-defined geometry. These light fields may be static or dynamic, and may be generated by any suitable mechanism, for example a spatial light modulator (SLM). The SLM controls either the phase or the amplitude of a light field, or possibly both, to provide the necessary intensity distribution. The light fields at each angle θ may be generated simultaneously or sequentially in time. In the sequential case, they may be generated in any order. The present disclosure significantly advances the process possibilities in this area, providing a means to generate a 3D radiation dose distribution within a given volume, allowing for nearly arbitrary structures in photopolymer curing.

This present disclosure is based on spatial and/or temporal multiplexing of three-dimensional (3D) optical light fields with respect to a photosensitive resin bath volume. Multiplexing can be accomplished in a number of ways including, but not limited to, those described in the specific embodiments and methods in the following paragraphs. Multiplexing may be implemented as to cure 3D user-designed geometries in situ in the photopolymer build volume by delivering a controlled exposure dose to selected regions of the resin.

Conceptually, the teachings of the present disclosure build upon the well-developed field of computed tomography (CT). CT generally refers to imaging of a 3D volume from multiple angles, most often by X-rays transmitted through the volume, where each image is sequentially generated by illumination from azimuthally-arrayed directions. The 3D volume is then reconstructed by various known computational techniques. Such known computational techniques may include Fourier-domain methods such as filtered back-projection (FBP) or iterative optimization-based techniques. See, e.g., S. W. Smith, "The Scientist & Engineer's Guide to Digital Signal Processing," $1^{st}$ Ed., San Diego, Calif.: California Technical Pub, 1997. With CT approaches being useful for capturing and recording 3D geometrical information, computed axial lithography (CAL) inverts the concept to generate a 3D geometry from exposures of a photopolymer from multiple angles. The embodiments described herein retain the "volume-at-once" capability, while significantly improving the geometric flexibility of the three beam holographic lithography approach (Shusteff et al., supra), which eliminates conventional discretization "stairstep" artifacts.

For cancer therapeutic purposes, CT optimization has been used to deliver intensity-modulated radiation therapy (IMRT), which delivers a targeted 3D distribution of radiation doses to specific regions within a patient's physiology, while minimizing the dose in non-target areas. See, e.g., T. Bortfeld, J. Bürkelbach, R. Boesecke, and W. Schlegel, "Methods of image reconstruction from projections applied to conformation radiotherapy," Phys. Med. Biol., Vol. 35, No. 10, pp. 1423-1434, October 1990. The constraints of 3D lithographic fabrication are typically less stringent, suggesting that a similarly-specified 3D dose distribution of radiation can be used to cross-link a photosensitive resin.

Tomographic Image Computation

Figure 1A:
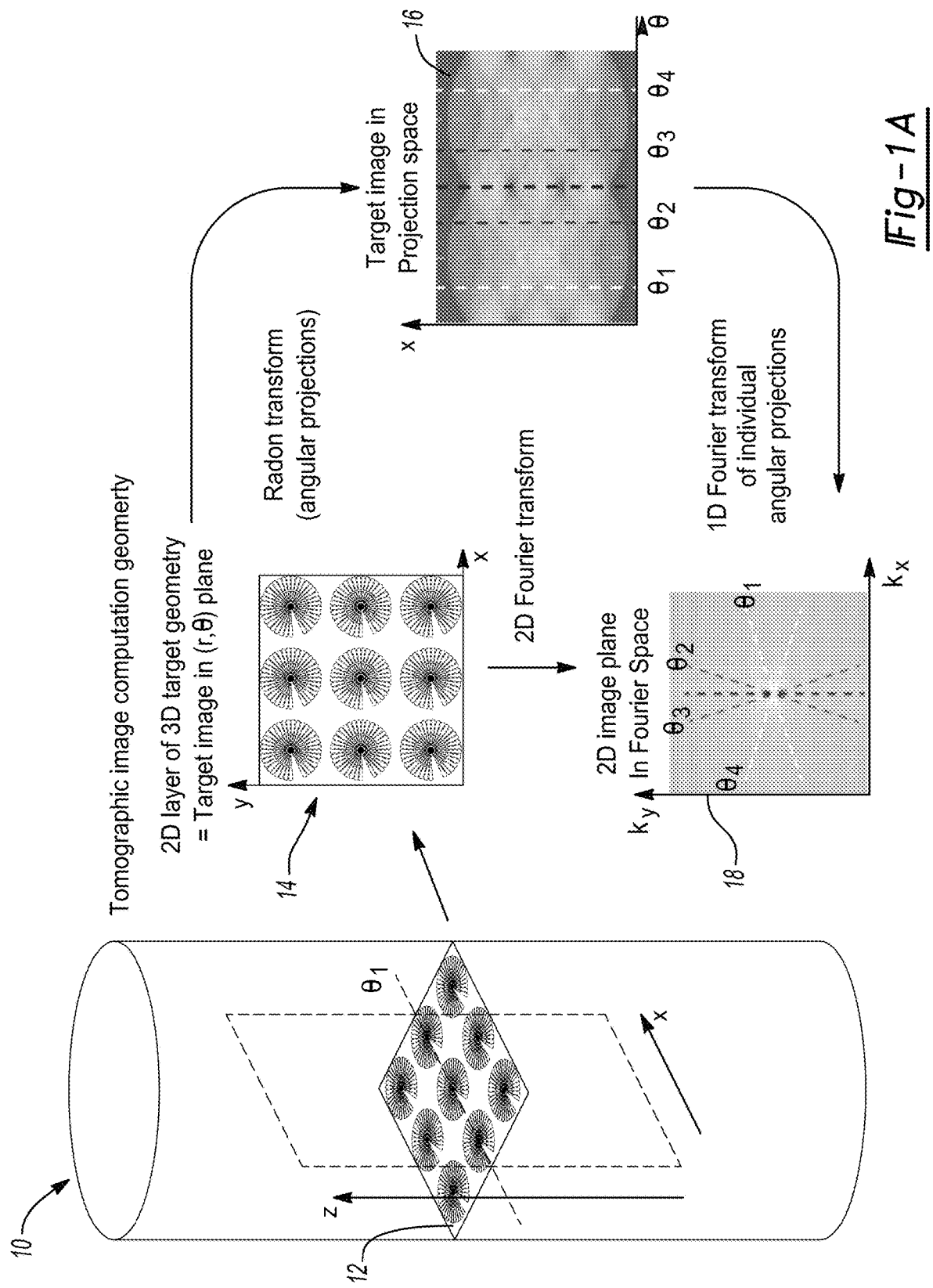
FIG. 1A shows a plurality of diagrams providing an overview of the underlying mathematical relationships used to computationally design optical projections. These optical projections can be generated physically by various embodiments of the present disclosure to create a target intensity distribution.
Figure 1D:
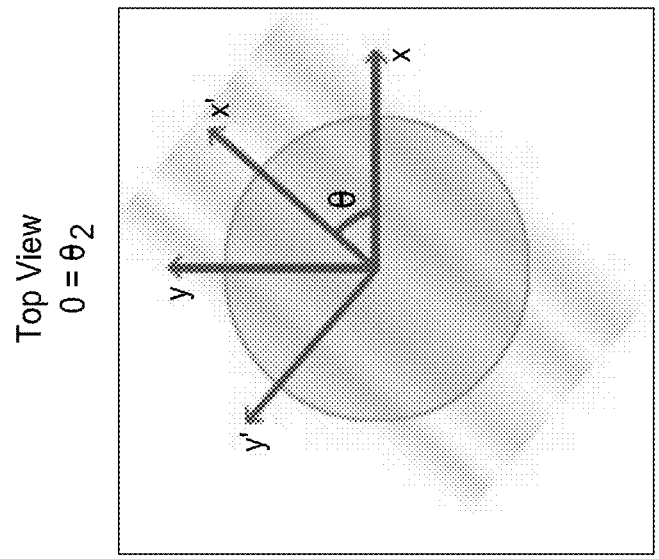
FIGS. 1B-1D illustrate the coordinate system that is used in the present disclosure to help describe the various embodiments.
Figure 1C:
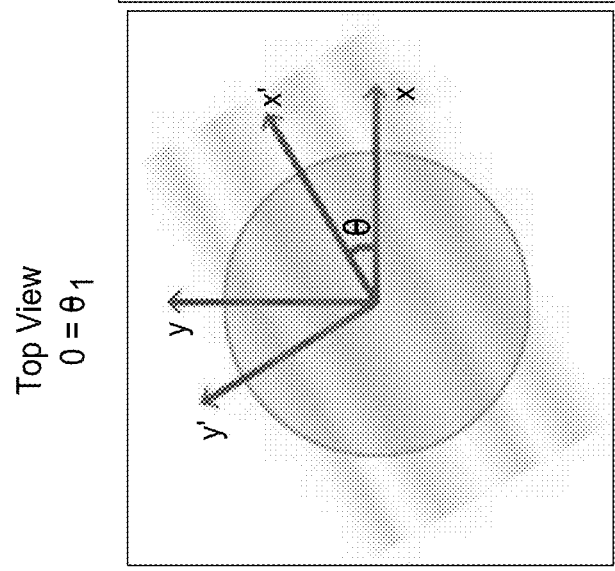
Figure 1B:
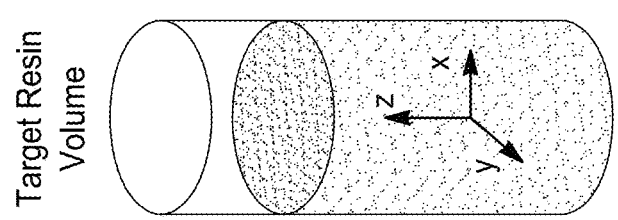

To understand the relationship between the target 3D part geometry, and the computed projections, consider FIG. 1A, as well as the coordinate system designations in FIGS. 1B-1D. For the following discussion, it is convenient to adopt a global Cartesian coordinate system (x,y,z) to refer to the 3D build volume and a rotated Cartesian coordinate system (x',y',z') whose orientation depends on the angle θ of the projection being considered. In these coordinate systems, z is the axis for azimuthal arraying of exposures at angles θ around volume 10. For each angle θ, a projection is computed. At a particular angle θ, we define a projection as a two-dimensional function $P_\theta(y',z)$ which fully determines a three-dimensional intensity map $I_\theta(x,y,z)$ generated in the target volume (note that $P_\theta$ depends on the angle θ but will be referred to as a two-dimensional function as it has two spatial dimensions). In the simplest case the projection can be thought of as a two dimensional image in the (y',z) domain which propagates through the resin volume in the x' direction. In this idealized case, the 3D intensity profile generated by the projection looks like the (y',z) domain image extruded through the target volume in the x' direction. This approximation holds well physically if the illuminating projections are collimated. In medical imaging applications, this is analogous to parallel beam tomography. For the present disclosure, this is a sufficiently good approximation whenever the optical configuration has a long depth of focus (particularly relevant for the small diffraction angles available with current SLM technology). In the general case, an optical propagation and attenuation model describes the 3D intensity map generated from a 2D projection function at a particular angle. In this description and in FIG. 1A we consider the idealized case for simplicity in describing the method.

The objective of the tomographic image computation is to design a set $P(y',z,\theta)$ of 2D projection images from a range of angles θ such that the 3D intensity map generated from the superposition of the 3D light fields generated from each projection closely or exactly approximates a target 3D intensity map. From a known target 3D intensity map we now consider design of the projections. To further simplify the explanation, we reduce the problem of generating a set of 2D projections for a 3D intensity map to that of generating a set of 1D projections $P(y',\theta)$ for a 2D intensity map $I(x,y)$. Again, in this case, 1D refers to the one spatial dimension y'. In the physical (x,y,z) resin volume system, we can think of the 2D intensity map as a horizontal constant z slice of the true 3D intensity map. Ultimately, the 2D projection $P_\theta(y',z)$ at a give angle θ can then be generated by stacking of the each of the computed 1D projections at each z-plane for that particular angle.

Among the many ways to accomplish CT image reconstruction, two major approaches that lend themselves readily to dose-optimization for fabrication are filtered back-projection (FBP) and iterative optimization-based algorithms. Here we first consider the FBP approach and its limitations, and describe how it may be used to provide useful starting parameters for an optimization algorithm.

The FBP approach for reconstructing a 2D optical density distribution within an (x,y) plane for a given value of z starts with computing a mathematical 1D projection at each of M angular samples ($\theta=\theta_1, \theta_2, \ldots \theta_M$). These projections taken together comprise the Radon transform of the 2D image. From the projection slice theorem, as discussed in R. Bracewell, "Strip Integration in Radio Astronomy," Aust. J. Phys., Vol. 9, No. 2, p. 198, 1956 and R. N. Bracewell, "Numerical Transforms," Science, Vol. 248, No. 4956, pp. 697-704, May 1990, which are both hereby incorporated by reference into the present disclosure, it is known that the Fourier transform of each 1D projection at a particular angle θ is exactly equal to a 1D sample of the Fourier transform of the original 2D density distribution. This 1D sample lies along a line through the origin in the Fourier domain and is sloped at an angle θ. This is depicted in FIG. 1A. Sufficiently dense sampling in the Fourier domain is required for an accurate CT image reconstruction. To appropriately choose the number of samples M in the Fourier domain, one possible conservative heuristic is to ensure that the maximum distance between slices is no greater than the separation of N sample points in the radial direction. This leads to πN/2 angular samples within 180 degrees of angular range.

The lithographic fabrication of each 2D z plane can follow an algorithmic time reversal of the CT imaging process. The target 2D Intensity map for the slice $I_z(x,y)$ is transformed into the Fourier domain, then sampled along each of the M azimuthal angles, generating M 1D intensity distributions, or projections $P_\theta(y')$, one for each angle $\theta_1, \theta_2, \ldots \theta_M$. Each of these distributions is used to expose the target plane with its respective pattern from its specific angle, which corresponds to building up the sample in the Fourier domain from slices through the origin. FBP for CT reconstruction relies on high-pass spatial filtering before back-projection in order to deemphasize the low frequency oversampling inherent to the central slicing approach. An equivalent way to describe this would be as a radially increasing ramp filter. This filter typically leads to negative excursions in the back-projected images that are unphysical for lithography. Some heuristic approaches to eliminate negative values, producing images suitable for lithography, include imposed positivity constraints or offsetting the calculated image. The results of such heuristics impose trade-offs between the contrast and resolution of calculated dose distributions; however, they can be used as initial dose estimates for a constrained optimization procedure.

Briefly, an optimization procedure takes as its starting point a forward process model that relates resin monomer crosslinking to the received light energy dose. Various 2D versions of such models, such as discussed at D. Dendukuri, P. Panda, R. Haghgooie, J. M. Kim, T. A. Hatton, and P. S. Doyle, "Modeling of Oxygen-Inhibited Free Radical Photopolymerization in a PDMS Microfluidic Device," Macromolecules, Vol. 41, No. 22, pp. 8547-8556, November 2008, the teachings of which are hereby incorporated by reference herein, are available, with limited progress toward 3D analogs. Comparing the modeled degree of cure (induced by the summed dose distribution from all angles), to the desired part geometry, an error function is generated, which is reverse-transformed and used to modify the initial dose estimate. This cycle is iterated for a number of cycles sufficient to meet a particular error criterion, such as edge sharpness, contrast, or total error over the build volume. The optimization procedure provides a means for process non-linearities such as intensity absorption to be accurately modeled and accounted for in the image generation. This is a significant benefit in terms of feature quality. The extension from 2D planes into 3D is straightforward, with the 1D intensity patterns from each z plane assembled into a 2D y'-z image for projection at every angle θ corresponding to the particular x' propagation direction. Effectively, this is a physical projection of the computed Radon transforms for all z planes at each angle θ to reconstruct the desired 3D dose volume.

One specific embodiment which implements the above described method is system 24 shown in FIG. 2A. The system 24 may include a plurality of optical subsystems 26 arranged such that a set of optical projections $P(y',z,\theta)$ at specific selected angles $\theta_1, \theta_2, \ldots \theta_M$, is generated around a target volume of resin 29 contained within an optically transparent container 29a. One possible design of the optical subsystems 26 may include an OLED array 27 covered by microlenses 28 surrounding the 3D target volume of resin 29. The OLED arrays 27 may be controlled in part by a controller 26a. Different groups of the optical subsystems 26 simultaneously generate projections $P_\theta(y',z)$ and corresponding 3D intensity maps $I_\theta(x,y,z)$ 26₁, 26₂, 26₃, etc., at different angles $\theta_1$, $\theta_2$, $\theta_3$, respectively, etc., that project through the target resin volume 29, as shown in FIG. 2B. The projections $P_\theta(y',z)$ and Intensity maps $I_\theta(x,y,z)$ are analogous to those described in section [0019]. FIG. 2B illustrates the 2D nature of each of the optical projections 26₁, 26₂, 26₃. The projections 26₁, 26₂, 26₃ are delivered to the target resin volume 29 contained within the resin container 29a simultaneously from M different angles $\theta$ (i.e., two or more) about the z-axis (FIG. 2B). The simultaneous superposition of the 3D intensity fields 26₁, 26₂, 26₃, etc., from all angles around the full 360 degree circumference of the target resin volume 29, as indicated in FIG. 2A, generates a 3D intensity function $I(x,y,z)$ in space. This intensity function acts over a fixed temporal exposure period. During exposure, regions where material formation is desired receive a sufficient optical energy dose to cause solidification due to photo-responding, while regions where formation (i.e., responding) is not desired receive an insufficient dose. After the exposure period, the resin container 29a may be rinsed to remove uncured resin from regions of the 3D part which have received an insufficient dose of optical energy to achieve photo-curing.

Further underlying information on light field photography and 3D displays may be found in Ng, R., 2006. "Digital Light Field Photography (Doctoral dissertation, Stanford University) and Lanman, D. and Luebke, D., 2013 "Near-eye light field displays" (ACM Transactions on Graphics (TOG)), Vol. 32, No. 6, p. 220, the disclosures of which are hereby incorporated by reference. This information is relevant to the possibility of creating the necessary optical subsystems from arrays of LEDs covered by microlenses. The system 24 thus forms a means of simultaneously generating images from many viewpoints and simultaneously exposing the entire target volume of resin 29 to the projections 26₁, 26₂, 26₃ from each angle $\theta$. Because each projection 26₁, 26₂, 26₃ acts on the volume simultaneously, the final 3D part can be printed in a single step.

By printing in a single step and avoiding serial layer-by-layer printing, a number of potential issues which may arise in existing AM methods can be addressed. These include difficulties in printing overhang geometries as well as avoiding layering artifacts such as poor surface finish and mechanical anisotropies. An additional benefit of this approach is that the structure being built does not move relative to the fluid medium, enabling fabrication of very compliant or fragile components such as low-volume fraction hydrogel scaffolds (combined with suitable rinsing/drying approaches, such as solvent exchange followed by supercritical CO2 drying).

Referring to FIG. 3, a system 30 is shown which generates a 3D exposure dose distribution over a fixed time interval by physical rotation of a target volume of resin 32 about a z axis 42, synchronized via a controller 31 with temporal manipulation of a single 2D optical projection from a digital light processing (DLP) projector or other image generation optical system 34. In the implementation as described previously herein, the image generation optical system 34 produces a collimated optical image or projection 36 from a single direction along an axis x' 41 that impinges on the target volume of resin 32. It will be appreciated that the images could also have some divergence (i.e., not collimated) and the algorithm to design them could be updated accordingly.

The relative angle $\theta$ between the incident light of the projection 36 and the target volume of resin 32 is changed in time as different (y',z) plane images are sequentially projected. Following the coordinate system convention described earlier and depicted in FIGS. 1B, 1C, and 1D, the (x,y,z) system rotates about the z axis as the target volume of resin 32 rotates and the (x',y',z) system remains fixed in space. Thus, as the target volume of resin 32 rotates, the angle $\theta$ between the x-axis and x'-axis changes. In one example, a resin containment vessel 38 that holds the target volume of resin 32 is mounted on a rotating mount or stage 40. The rotating stage rotates about z axis 42 and operation of the DLP projector 34 is synchronized with rotation of the mount 40 by the controller 31. The containment vessel 38 may be submerged within a second containment vessel 44 which contains a fluid 46 with the same (or similar) refractive index as the resin 32. This provides a flat interface where the refractive index changes and mitigates lensing effects which would arise at a curved interface of mismatched refractive index. Note that in the description of the above system, the coordinate notation is such that the x'-axis is stationary while the (x,y,z) coordinate system rotates with the resin containment vessel 38.

Another embodiment of the system 30 shown in FIG. 3 may involve the use of a plurality of DLP projectors 34 (i.e., a plurality of optical subsystems) positioned to face each of the four vertical sides of the second containment vessel 44, to generate the plurality of optical 2D projections. Still another embodiment may involve a modification to the system 30 shown in FIG. 3 in which the containment vessel 38 and the second containment vessel 44 are both held stationary, while the DLP projector 34 (i.e., the optical subsystem) is rotated on a doughnut shaped support 34a around the full circumference of the containment vessel 38 to produce the plurality of optical 2D projections. Still further, both the 2D optical projection and the containment vessel 38 could be rotated simultaneously.

Still another variation of the embodiment shown in FIG. 3 may involve using photo-degradable (i.e., photo-responsive) material instead of a resin. For example, one might start with a solid 3D block of photo-degradable material and use optical 2D projections as described herein to remove only certain portions of the solid 3D block to produce a desired 3D part. Such materials are used, for example, in tissue engineering.

Referring to FIG. 4, a system 50 in accordance with another embodiment of the present disclosure is shown. With the system 50, a resin volume 52 is contained within a stationary container 54. A secondary container 55 may be used to hold an additional quantity of fluid 55a which has the same (or similar) refractive index as the resin volume 52. An optical subsystem 56, produces an optical projection 58 along an x axis (fixed relative to the stationary target volume). The 3D intensity map generated by the projection is rotated around the resin volume 52 (i.e., about z axis 60, and propagating along a rotating x'-axis 61) via a rotating arm assembly 50a. A stationary mirror 62 receives the projection 58 and feeds it to a collection of mirrors 64-68 contained within the rotating arm assembly 50a. The mirrors 64-68 direct the projection 58 to illuminate the resin volume. As the arm rotates, y'-z plane images are projected at many angles $\theta$ about the full circumference. As is the case with the other embodiments, the net exposure dose from the sum of the 3D intensity distributions generated from all of the projections over one rotation is such that regions where material formation is desired receive a sufficient dose to photo crosslink the resin while other regions receive an insufficient dose. Spatial and temporal modulation of the projections (i.e., modulation of image intensity of the 2D (y'-z) images being projected) 58 at each angle θ is controlled in the same way as described above for FIGS. 2A-2C, for example, by means of an spatial light modulator (SLM) 70 or DLP projector. The system 50 allows for potentially much faster rotation speeds compared to the methodology described in connection with FIG. 3, as fluid motion considerations are eliminated. Compared to the methodology described in connection with FIGS. 2A-2B, the system 50 offers the advantage of a simpler optical system based in prior art. The proposed configuration shown in FIG. 4 can be applied with one or more simultaneously rotating optical projections. Similarly to the methodology described in connection with FIGS. 2A and 2B the resin container 54 does not move relative to the fluid during fabrication, so the formation of more fragile, delicate or compliant structures is possible.

Finally, the optical signal multiplexing necessary to achieve Computed Axial Lithography could be performed by systems which share features of any or all of the embodiments described above. As one example, a light field projection display (FIGS. 2A-2B) which does not span a full 360° of angular projection could be combined with a rotating vial, similar to what is used with system 30 of FIG. 3, in order to expand the angular range. For example, consider the use of a curved display such as shown in FIGS. 2A and 2B, which instead of having a cylindrical shape looks like a half-cylinder or a smaller angular section of a cylinder. It still projects images from multiple angles simultaneously but the range of angles spans less than 360 degrees (in the half cylinder case it's 180 degrees). However if that display is rotated about the resin volume and the projections are updated in time, then it is possible to span a full 360 degrees, even faster than what could likely be achievable in the embodiment shown in FIG. 4. Such an embodiment would likely not print as fast as the FIG. 2 embodiment but it may be easier to fabricate. Similarly, target volume of resin could remain static while the <360 degree projection display is rotated about the volume.

The system and method of the present disclosure surpasses recently reported volumetric aperiodic three-dimensional (3D) structure fabrication using holographic light fields in its geometric flexibility. Similarly, the inherently volume-based approach of the present disclosure provides an order of magnitude improvement in fabrication speed over conventional layer-by-layer "2½D" printing techniques. Finally, the surface roughness problems imposed by layer-by-layer fabrication are substantially reduced if not removed entirely.

The system and method of the present disclosure is expected to find utility in a number of applications. For example, the system and method of the present disclosure provides an improvement to photopolymer-based additive manufacturing in a number of important aspects, such as more rapid part generation, improved surface quality (e.g., no "stair step" artifacts from layering), and a reduction of geometric constraints that arise from 2D layer slicing and simplified post-processing. Potential applications of the various embodiments and methods described herein may involve AM generated optics with high quality surface finish; hollow or overhanging structures; large dynamic range mesoscale AM structures; printing/fabrication on a previously fabricated 3D structure immersed in a resin; and processing soft, flexible or brittle polymers and geometrically delicate/fragile structures (as there is no relative structure/fluid motion during printing).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for forming a three dimensional (3D) object from a volume of photo-responsive material contained within a material container, the system comprising:
   a controller;
   a plurality of optical projection subsystems adapted to be arranged circumferentially around a material container containing the volume of photo-responsive material, and in communication with the controller;
   the plurality of optical projection subsystems controlled by the controller to direct optical projections at a plurality of angles θ through the volume of photo-responsive material, the optical projections further being directed about a z axis extending through the volume of photo-responsive material; and
   the plurality of optical subsystems further being controlled by the controller to provide each of the optical projections with a calculated three-dimensional intensity distribution acting over a fixed temporal exposure period, which is sufficient to cure one or more selected portions of the volume of photo-responsive material, and leave other portions unmodified, to form the 3D object.

2. The system of claim 1, wherein the optical subsystems are controlled by the controller to direct the optical projections at the plurality of angles θ, and in a manner to simultaneously superimpose the optical projections to generate a 3D intensity function in space.

3. The system of claim 1, wherein the optical subsystems comprise an OLED array.

4. The system of claim 3, wherein each of the optical subsystems further includes a microlens.

5. The system of claim 1, wherein the optical subsystems comprise an array of organic light emitting diodes (OLEDs) each having an associated microlens, and wherein the generation of the optical projections at a plurality of angles θ comprises generating the optical projections such that each of the optical projections is generated from a particular angle θ associated with a one, or a subset, of the OLEDs.

6. The system of claim 1, wherein the controller controls the optical projections generated at a plurality of angles θ by:
   generating a one dimensional (1D) intensity pattern for a particular z plane at each angle θ, for each one of a plurality of z planes extending through the z axis; and
   assembling the 1D intensity patterns for a particular angle θ, for each z plane, into a two dimensional (2D) image projection from that angle θ, and doing this for each angle θ.

7. The system of claim 1, wherein the controller is configured to use a Fourier-domain method including a filtered back-projection (FBP) technique to cause the optical subsystems to deliver the optical projections at a plurality of angles θ.

8. The system of claim 1, wherein the controller is configured to use a Fourier-domain method including at least one of a filtered back-projection (FBP) technique or iterative optimization-based techniques, to cause the optical subsystems to deliver the optical projections at a plurality of angles θ.

9. The system of claim 1, further comprising the material container.

10. The system of claim 9, wherein the material container comprises an optically transparent material container.

11. The system of claim 10, further comprising a secondary container for containing the optically transparent material container, where the secondary container is adapted to be filled with a fluid which has a refractive index matched to that of the photo-responsive material.

12. The system of claim 1, wherein at least one of the plurality of optical subsystems comprises a spatial light modulator (SLM) which controls an amplitude of the optical projections.

13. The system of claim 1, wherein at least one of the plurality of optical subsystems comprises a spatial light modulator (SLM) which controls a phase of the optical projections.

14. A system for forming a three dimensional (3D) object from a volume of photo-responsive material contained within a material container, the system comprising:
a plurality of OLED arrays each forming an independent optical projection subsystem, the OLED arrays configured at least partially circumferentially around a material container containing the volume of photo-responsive material;
the plurality of OLED arrays configured to direct optical projections at a plurality of different angles θ through the volume of photo-responsive material; and
the plurality of OLED arrays further providing each of the optical projections with a calculated three-dimensional intensity distribution acting over a fixed temporal exposure period, which is sufficient to cure one or more selected portions of the volume of photo-responsive material, and leave other portions unmodified, to form the 3D object.

15. The system of claim 14, wherein the optical projections are directed about a z axis extending through the volume of photo-responsive material.

16. The system of claim 14, wherein each one of said OLED arrays includes a microlens.

17. A system for forming a three dimensional (3D) object from a volume of photo-responsive material contained within a material container, the system comprising:
a controller;
an optical projection subsystem responsive to the controller for generating a plurality of two dimensional (2D) optical projections aimed at the material container; and
a rotating arm assembly having a plurality of mirrors configured to receive and direct the plurality of 2D optical projections toward the volume of photo-responsive material, such ones of one of the plurality of 2D optical projections are directed at a plurality of different angles θ relative to the volume of photo-responsive material contained in the material container, to thus cure at least selected portions of the photo-responsive material;
the controller configured to control the 2D optical projections generated at a plurality of angles θ by:
generating a one dimensional (1D) intensity pattern for a particular z plane at each angle θ, for each one of a plurality of z planes extending through a z axis of the material container; and
assembling the 1D intensity patterns for a particular angle θ, for each said z plane, into a two dimensional (2D) image projection from each said particular angle θ, and repeating the assembling of the 1D intensity patterns for each said angle θ.

18. The system of claim 17, further comprising a secondary container for containing the optically transparent material container, wherein the secondary container is adapted to be filled with a fluid which has a refractive index matched to that of the photo-responsive material.

19. The system of claim 17, wherein the optical projection subsystem is held stationary and only the material container is rotated by the rotating arm assembly.

20. The system of claim 17, further comprising:
a stationary mirror for receiving the 2D optical projections and feeding the 2D optical projections to the plurality of mirrors of the rotating arm assembly; and
a mount for supporting the material container, wherein the mount is rotated to rotate the material container while the 2D optical projections are directed toward the photo-responsive material.

21. The system of claim 17, further comprising the material container.

22. The system of claim 21, wherein the material container comprises an optically transparent material container.

23. The system of claim 17, wherein the controller is configured to use Fourier-domain methods including at least one of a filtered back-projection (FBP) technique or iterative optimization-based techniques, to cause the optical projection subsystems to deliver the 2D optical projections at a plurality of angles θ.

24. The system of claim 17, wherein the optical projection subsystem comprises a spatial light modulator.

* * * * *